March 17, 1959   L. J. CHRISTMANN ET AL   2,878,169
APPARATUS FOR THE MANUFACTURE OF HCN
Original Filed April 24, 1947
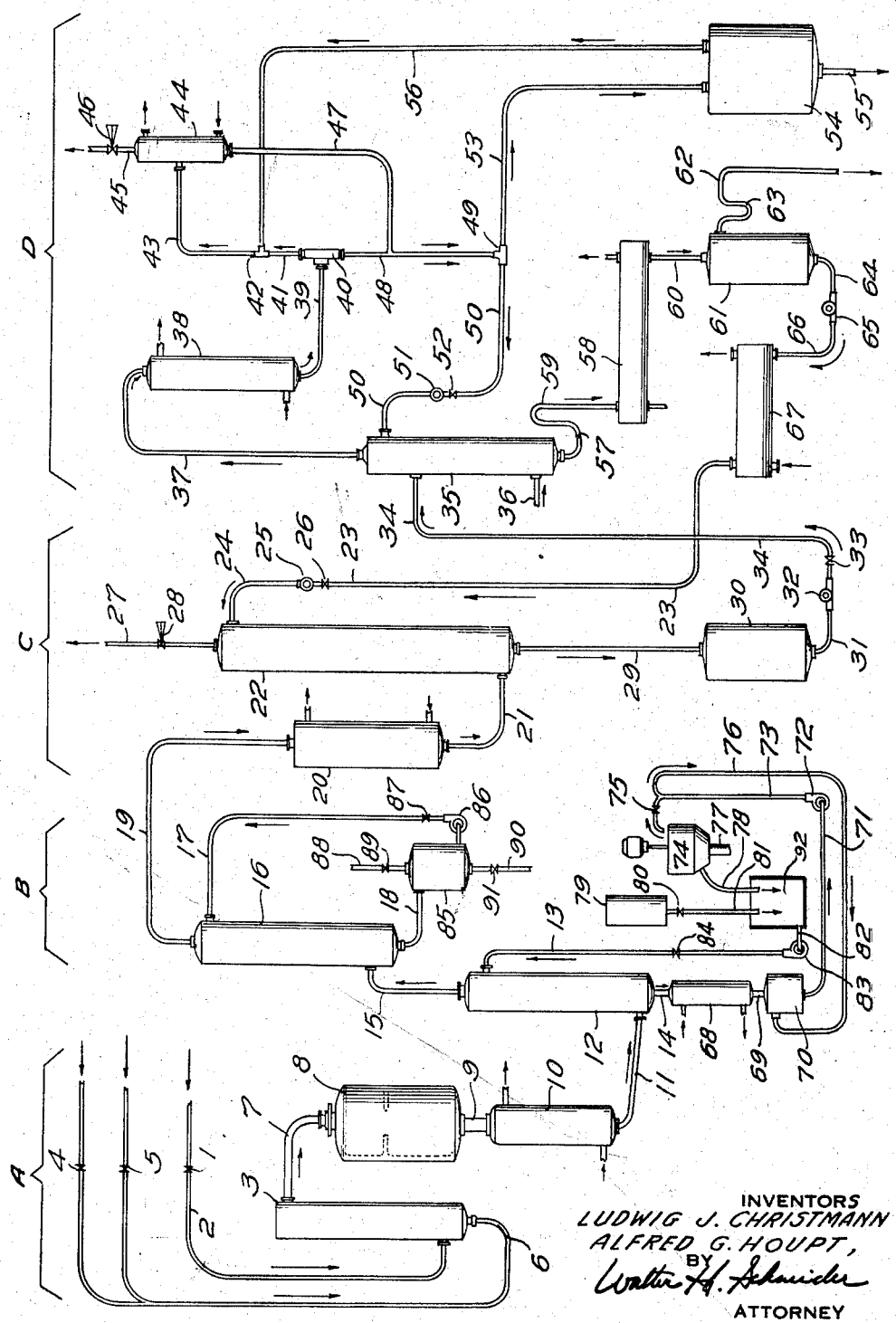
INVENTORS
LUDWIG J. CHRISTMANN
ALFRED G. HOUPT,
BY
ATTORNEY

United States Patent Office 2,878,169
Patented Mar. 17, 1959

2,878,169
APPARATUS FOR THE MANUFACTURE OF HCN

Ludwig Jacob Christmann, Bronxville, N. Y., and Alfred Gordon Houpt, Stamford, Conn., assignors to American Cyanamid Company, New York, N. Y., a corporation of Maine Original application April 24, 1947, Serial No. 743,592. Divided and this application December 6, 1952, Serial No. 324,506

1 Claim. (Cl. 202—168)

This invention relates to an apparatus for performing catalyzed reactions in the vapor phase. More particularly, it relates to an apparatus for producing hydrocyanic acid by a catalyzed reaction of a mixture comprising ammonia, a gaseous or volatilized hydrocarbon and oxygen. Still more particularly, the invention contemplates a novel combination of apparatus especially adapted to carry out the catalyzed reaction and for isolating the hydrocyanic acid content of the combustion products. As such, this application represents a division of application for United States Letters Patent Serial No. 743,592, filed April 24, 1947, now U. S. Patent No. 2,656,251, by Alfred G. Houpt and Ludwig J. Christmann.

Production of hydrocyanic acid for numerous uses has been accomplished in many different ways. Some of these, for example, the acid treatment of cyanides, have been developed industrially to produce large annual tonnages. Because of the importance of the product, frequent proposals have been advanced for processes using novel or more readily-available raw materials. These usually represent attempts to lower production costs. However, for various reasons, none of these newer proposals have proved to be wholly successful.

One of the more promising appearing of such proposals was to react a gas mixture comprising ammonia, a gaseous or vaporized hydrocarbon, and the requisite amount of oxygen or air. The mixture, at or below atmospheric pressure, was to be subjected to combustion in the presence of a suitable catalyst, preferably a metallic platinum-iridium alloy, although other noble metals and alloys were suggested. The hydrocyanic acid content of the combustion products was to be separated therefrom.

Theoretically, the operation of such a process appears to offer many commercial advantages. At the outset, readily-available starting materials are utilized. In addition, the reaction would appear to be capable of being readily conducted in simple apparatus. In attempted practice, however, appearances proved to be deceptive. Many difficulties, largely unexpected, were encountered.

Successful operation was found to involve a number of operations: i. e., proper mixing and proportioning of the gases; reacting the mixture to produce a combustion-products mixture containing HCN, unreacted $NH_3$ and waste gases; removal of the $NH_3$; and collection and purification of the HCN content of the residue. Each of these operations introduced problems which impressed, on the overall problem, additional difficulties, requiring careful consideration.

Illustrative of these problems, for example, are some of the difficulties involved in the third operation, removal of the unreacted $NH_3$. It must be removed to purify the HCN, if for no other reason. In addition, as the most expensive reactant, in any practical operation it must be not only removed but recovered. Still further, it must be removed promptly and completely to prevent the action of $NH_3$ in aiding the formation of a tarry product, largely azulmic acid, from the HCN. Not only is the latter a direct loss of product but, by clogging the system, formation of such tarry product may require periodic work stoppages for cleaning at such frequent intervals as to make operation impractical. Finally, HCN and $NH_3$ have solubilities in water of the same order of magnitude. Selective absorption in water would therefore appear to be impractical, if not impossible. So is the use of selective dry absorbents or liquid fractionation by cooling to low temperatures.

In attempting to carry out the overall operation, it was found that not all of these factors had been properly considered. Satisfactory and/or operable answers to all the various problems had never been found. Still further, it was found that not all the operations could be adequately carried out in or by means of available apparatus for the purpose. Nevertheless, if these operating and apparatus problems could be overcome, the inherent advantages of such a process make it a highly desirable one.

It is, therefore, a principal object of the present invention to devise a suitable apparatus combination in which the process can be readily carried out. Such an apparatus should preferably be of simple design but at the same time adapted to conduct the process in such a manner as to overcome the above mentioned difficulties.

In general, the objects of this invention have been met by a novel apparatus combination which permits effective practice of the catalytic reaction including, particularly, recovery of unreacted reactants, collection of product HCN and avoidance of substantial loss of washing and absorbing mediums by recirculation thereof.

The invention can perhaps be best described in conjunction with the accompanying drawing in which is shown by diagrammatic representation a flow scheme illustrating a combination of apparatus adapted to carry out the process efficiently. As shown in the drawing, the apparatus may be roughly divided into four sections: (a) mixing and reacting the gaseous mixture; (b) removing unreacted ammonia from the reacted mixture; (c) absorption of the HCN content of the residue; and (d) HCN purification. In discussion of the apparatus and its functions, it will be described in conjunction with the process for which it is intended.

Oxygen or equivalent amounts of air, in amounts controlled by a suitable valve 1, or its equivalent, is introduced through conduit 2 into some conventional type of mixer-filter 3. Ammonia gas and a hydrocarbon gas or vapor, in amounts controlled by valves 4 and 5 respectively, are combined in conduit 6 and fed into the same mixer-filter 3. Use of the mixer-filter is important in removing from the gases any dust, particularly iron-bearing dust, which may adversely effect the active life of the catalyst.

From mixer-filter 3, the reaction mixture is conducted through conduit 7 to a reaction chamber 8. This chamber may be of any suitable design. Such a design should preferably include a chamber to hold the gas mixture, means for passing the gas through or over a catalyst, a combustion chamber and means to remove the combustion products. Since the particular design of the chamber is not a part of this invention any suitable reactor may be used. No structural details need be given. An excellent apparatus for the purpose is shown in United States Patent No. 2,584,080.

The reacted mixture is taken through conduit 9 to a suitable, conventional type of cooler 10 and thence through conduit 11 to the unreacted $NH_3$ removal operation. Since at least part of the reacted mixture is soluble in water and the latter is the most practical coolant, cooler 10 should be of a type in which no liquid-gas contact is made. The purpose of cooler 10 is purely temperature reduction to lower the reacted gas temperature, which may reach 900°–1000° C. or more, to a level at which it can be handled in apparatus of reasonable size.

As shown in the drawing, cooled combustion products then pass through an NH₃ absorption tower 12 of some suitable type. In this treatment they are washed, preferably countercurrently, with a stream of some suitable liquid capable of serving as a selective absorbent for unreacted ammonia gas, which is always found remaining in the mixture. The liquid absorbent is introduced through conduit 13 from a suitable source. Solution containing absorbed ammonia leaves the bottom of tower 12 through conduit 14 into a circulating system which serves as a source of the fluid entering tower 12 through conduit 13. This system, as well as the nature of the absorbing liquid, usually a hot dilute aqueous solution of a salt-forming acid, will be discussed below.

Ammonia-free combustion products pass out of absorption tower 12 through conduit 15. Obviously they may be then directly treated to dissolve the HCN content. Preferably, however, before doing so they should be washed as, for example, in wash tower 16, by slightly acidified water entering near the top through conduit 17 and leaving at the bottom through conduit 18. The nature of the wash liquor and the source of it will be noted below. While theoretically unnecessary and capable of omission, this washing is important in actual operation. In using a salt-forming acid solution for absorption in tower 12, washing prevents any entrained acid and/or ammonium salts being drawn into the rest of the system to cause corrosion problems and/or product loss.

The washed and substantially ammonia-free gas mixture then passes from the top of washer 16 through conduit 19 to a condenser-cooler 20 in which the temperature is reduced to a suitable level for effective HCN absorption. From cooler 20, gas passes through conduit 21 into the bottom of a tray absorber 22. HCN absorbing liquid, is brought into absorber 22 near the top thereof, through conduits 23 and 24 at rates indicated by flow-meter 25 and controlled by valve 26. Absorber 22 is vented to the atmosphere through conduit 27 and a pressure-controlled relief valve, indicated at 28. Substantially all the inert gases, such as nitrogen, pass from the system therethrough.

HCN solution leaves the bottom of absorber 22 through conduit 29. It is desirable, though theoretically unnecessary, to pass the solution into a suitable surge tank 30. From here, solution is withdrawn through conduit 31 by pump 32 in amounts controlled by varying the speed of pump 32 and/or by regulating valve 33 and is taken by conduit 34 to a steam-stripping column 35. Live steam is introduced into the bottom of stripper 35 through conduit 36. The resultant vapors are removed at the top through conduit 37 and passed through a condenser 38. Condensate and vapors from condenser 38 pass through conduit 39 to gas separator 40 which is vented through conduit 41, T 42 and conduit 43 to a suitable vent condenser 44. Any small amounts of non-condensable gases and vapors, usually only a little CO₂, are vented to the atmosphere through conduit 45 and pressure-controlled vent 46.

Any condensate formed in vent condenser 44 flows through conduit 47. Fluid is taken from separator 40 through conduit 48. Condensate from condenser 44 is combined in conduit 48 with the fluid from separator 40. Fluid flow from conduit 48 is divided by a suitable T connection 49. Part of the flow returns to the top of the stripper 35 as reflux through conduit 50 in amounts indicated by flow-meter 51 and controlled by valve 52. The remainder passes through conduit 53 to a suitable blow tank 54, or an equivalent holder. The product, as liquid HCN, is withdrawn from the blow tank, to use or to storage as may be desired, through conduit 55. Some provision for venting blow tank 54 is usually necessary. As shown in the drawing, this is easily accomplished by means of conduit 56 extending from the top of blow tank 54 to one arm of T 42 which forms the junction between conduits 41 and 43, the latter, as noted above, leading to vent condenser 44.

According to the present invention, provision is made for recycling liquor to HCN-absorber 22. For this purpose, an additional circuit is provided. Bottoms, which are hot, are drawn from stripper 35 through conduit 57 through which they are passed to a cooler 58. To maintain an operative amount of liquid in stripper 35, conduit 57 is equipped with some flow-restricting device such as the inverted U bend 59 or its equivalent. Cooled liquor from bottoms cooler 58 flows through conduit 60 to a bottoms storage tank 61. Tank 61 serves the dual purpose of storage and of removing surges from the line. Near the top of tank 61 there is provided an overflow conduit 62, equipped with some constant level control such as trap 63 or the like. Overflow 62 allows removal from the system of any excess bottoms due to water formed during reaction or introduced as steam entering at 36.

Bottoms from tank 61 are recycled as absorbing fluid to absorber 22. Cooler 58 may not reduce the temperature of the bottoms to a level sufficiently low for efficient absorption. Accordingly, although not under all conditions, it is usually desirable to further cool. For this purpose, as shown in the drawing, bottoms for reuse are withdrawn from the bottom of tank 61 through conduit 64 by pump 65 and sent through conduit 66 to an additional cooler 67 in which the coolant is cold water or brine from some external source at a temperature sufficiently low to produce the necessary temperature drop. The finally cooled bottoms, as noted above, return through conduit 23, flow-meter 25 and valve 26 and conduit 24 into the top of tower 22.

From the description of the apparatus, the operating principle of the present invention is believed to be fairly clear. However, there are several points which may require additional consideration. These can perhaps be best brought out by a discussion at this point of the preferred mode of operation.

As is brought out in United States Patent No. 2,496,999 of Alfred G. Houpt, one of the inventors herein, and Carlos W. Smith, it is highly desirable to be able to carry out the reaction of the ammonia-hydrocarbon-oxygen mixture under pressures above atmospheric. If, in the present invention, the pressurized reaction of the above-noted patent is to be employed, the gases and/or vapors will be delivered to the apparatus of the present invention under pressure. This may be done in various ways, as from some suitable pressure storage system or directly from suitable compressors. Otherwise, they may be delivered at atmospheric pressure, or less, in any conventional manner as taught in the past. In any case, the sources of the gases and/or vapors form no part of the present invention and are not illustrated.

One point should be noted in this respect. Unless the gases are fed to the various absorbers under pressure, and in the case of HCN absorber 22, cooled, excessively large apparatus will be required. Further, the HCN solution produced in absorption tower 22 will be very dilute. Neither of these conditions is desirable. Where the pressurized process of the above-noted patent is used, automatically this delivery of the gas to the absorbers under pressure is provided. Since the use of pressure has many advantages in itself this is the preferred operation in connection with the present invention. Such a pressure system is assumed and no gas compressors are shown in the illustration.

However, if the gas reaction is to be carried out, in accordance with the teaching of the prior art, at atmospheric pressure, or less, some compressor arrangement is necessary. The present invention is not particularly concerned with such operation. If it is desired to carry it out, it may be done quite simply by introducing compressors in any of conduits 21, 15 or 11. Use of such compressors is extremely disadvantageous from an operating point of view. For example, there will always be some tendency for condensate to accumulate in the compressor. The existence of ammonia in solution tends to promote the formation of the tarry precipitate which, as noted above, should be avoided if possible. Further, corrosion and fouling of such compressors which must be constructed of standard available materials which are in turn attacked either by condensate or by the gases directly, prevents continuous operation and introduces prohibitive maintenance costs.

In selecting starting materials for the reaction, certain considerations are generally helpful. For example, the hydrocarbon used in ordinary operation is preferably a permanent gas such as methane, ethane, propane and the like. Operation, however, is not so limited, since, if so desired, a heavier, volatilized, volatilizable hydrocarbon or a mixture of such hydrocarbons may be used by provision of suitable heating. Neither is it necessary that the hydrocarbon be pure since mixtures may be readily used. It is preferable, however, that the hydrocarbon be saturated. Natural gas mixtures which are rich in the lower saturated hydrocarbons are excellent for the purpose.

So far as the oxygen source is concerned, oxygen gas itself, or air enriched in oxygen, may be used. If the capacity of the apparatus is limited, there may be considerable advantage in so doing since thereby less inert gas need be processed. However, the economy of operation usually favors the use of air as the oxygen source. Ordinarily, therefore this will constitute the preferred operation.

As was noted above, provision must be made for selectively absorbing the ammonia under conditions at which little HCN is dissolved. For this purpose the most useful absorbent has been found to be an aqueous solution of a salt-forming acid so that any ammonia which goes into solution will be promptly taken up as a soluble ammonium salt. Substantially any acid may be used but, in general, sulfuric acid, for reasons of economy, is the most practical choice and the discussion will be illustrated in connection therewith although there is no intent that the process be so limited.

Because the ammonia, to the extent that it dissolves, is immediately transformed into a material whose solubility may have no relation to that of $NH_3$ gas, the liquid may be maintained at a temperature such that little or no HCN will be dissolved therein. The ammonia is removed because its being taken by the fluid does not depend alone on the solubility of gaseous $NH_3$ therein. The solution of the ammonium salt having practically no vapor tension with respect to ammonia may be maintained at a temperature high enough to minimize the solubility of HCN and to afford increased solubility for the ammonium salt.

A good practical operating temperature for the $NH_3$ absorption has been found to be about 175°–225° F. In general practice usually this may be even narrowed somewhat since it has been found that good operation is obtained at temperatures averaging around 200° F. The specific temperature chosen is not, in itself, critical. As a lower limit it must be high enough that as the ammonium salt-containing liquor leaves absorber 12 the amount of HCN dissolved therein is small. As to the upper limit, the boiling point of the liquor leaving tower 12 depends on the pressure therein. The maximum operating temperature should not be so high that the exit liquor temperature will exceed about 25°–35° F. less than its boiling point. This is preferred in order to avoid such excessive water vapor formation as would put a heavy load on the condensing and recirculating system.

Similarly, it is usually desirable that the washing operation be carried out at about the same temperature level. The same reasons apply: namely, the intent that losses of HCN by dissolution be minimized. As a practical matter, therefore, the temperature to which the reacted gases are reduced in cooler 10 is adjusted, by varying the coolant flow, to maintain these desired temperatures in towers 12 and 16. It is a feature of the present invention that it is highly flexible. The principal effect, therefore, of varying the operating temperature in towers 12 and 16 within the noted limits, it is to require temperature and flow adjustment throughout the rest of the apparatus to restore the system to heat balance. It will be seen that apparatus is readily capable of such adjustment to accommodate wide variations.

The strength of the salt-forming acid solution circulating through tower 12 may be varied considerably. Actually, acid contents below about 3–4% begin to require the handling of too much material and the use of acid strength above about 8–10% begin to create additional handling problems and, in the case of sulfuric acid, may tend to produce product losses. Using sulfuric acid as the illustrative solution, a good general practice has been found to keep the acid content as high as possible without exceeding about 7% by weight of sulfuric acid. Higher strengths make the separation of $(NH_4)_2SO_4$ crystals more difficult.

It will also be apparent that theoretically absorber 12 need not be particularly high to take out all the ammonia. On the other hand, since it is necessary to completely remove ammonia, it is advisable to allow a very appreciable excess capacity.

It is also possible, if a sufficiently small amount of liquid is circulated to tower 12, to build up in a single pass a fairly high ammonium salt concentration, limited by the acid concentration employed. This, however, is inadvisable. As a precautionary measure, a considerable excess of liquor should be circulated to insure substantially complete ammonia recovery. Using such a liquid flow, i. e., sufficient to provide excess capacity, the increase in concentration of ammonium salt produced in any single pass is not particularly high. On the other hand, it will be sufficiently high so that ultimately there will be an accumulation sufficient so that salt removal from the absorbing liquor must be carried out in some way.

It has been found that a good general practice is to feed the absorbing liquor to tower 12 at such an ammonium salt content that it will leave the tower substantially saturated. Under the operating conditions, and using 6–7% acid, this will be in the neighborhood of 35–40% by weight. The maintenance of a supply of absorbing liquor and the removal therefrom of accumulating ammonium salt is necessary. This may be done in any of a number of ways. One expedient is to precipitate solid salt, either by removing water or by removing heat from the solution leaving tower 12, and collect the resultant precipitate.

One salt separation system is indicated in the drawing. There is provided a storage tank 92. Therein a solution, in ordinary practice containing about 6–7% sulfuric acid and about 35–40% ammonium sulfate, is maintained. Liquor leaving tower 12 through conduit 14 passes through a suitable cooler 68 and then through conduit 69 into tank 70. Because of the heat removal in cooler 68, considerable ammonium salt is thrown out of solution. It will tend to accumulate in the bottom of tank 70.

From the bottom of tank 70 liquor containing solid salt is drawn through conduit 71 and sent by pump 72 through conduit 73 to a centrifugal separator 74, or its equivalent. Operation of the separator is intermittent, the flow thereinto being controlled by valve 75. To maintain the capacity of the pump in operation and prevent plugging lines 71 and 73 and pump 72, an open by-pass conduit 76 is provided to return the remaining liquor to tank 70.

In centrifugal separator 74 the solids content of the liquor is removed and passes out of the system through conduit 77. The solids-freed liquor returns from separator 74 to tank 92 through conduit 78. A storage tank 79 for sulfuric acid is provided, and from it, in amounts regulated by valve 80, sufficient acid is added to tank 92 through conduit 81 to make up the acid used up in forming the ammonium salt which was removed through conduit 77. Finally, acid solution is drawn from tank 92 through conduit 82 and return through conduit 13 to tower 12. Because tower 12 is under pressure, pump 83 is provided for the purpose of forcing liquor into the top of the tower and prevent flowbacks through conduit 13 into tank 92. The amount of liquor returned to tower 12 may be controlled by valve 84 in line 13, or by an equivalent arrangement.

Where, in accordance with the preferred operation of the process, a washing operation is carried out on the ammonia-free gases, some provision for wash liquor must be maintained. The gases leaving absorber 12 will be sufficiently hot so that the amount of HCN picked up by the wash liquor will be small, unless the wash liquor is quite cold. Even so, the potential HCN loss in this system can be appreciable. In addition, the wash liquor will pick up small quantities of acid and salt due to entrainment from absorber 12. To prevent excessive accumulation of these latter and excessive HCN loss, some provision for recirculating wash water must be made. Also, since the washer 16 will ordinarily be operating under pressure, provision must be made for introducing the wash liquor under pressure. This wash water system may take any desired form.

One such form is shown in the drawing. A storage tank 85 is provided in which wash liquor can be stored. Wash water is drawn therefrom by pump 86, in order to provide pressure, and forced in amounts controlled by valve 87 into the top of washer 16 through conduit 17. Used wash liquor, as noted above, is drawn from the bottom of washer 16 through conduit 18. Gravity and the pressure in the tower 16 will return the liquid in conduit 18 into tank 85.

In order to prevent excessive acid and salt accumulation, provision is made for introducing additional washing fluid into tank 85 through conduit 88 in amounts controlled by valve 89. Correspondingly, used wash liquor can be drawn from tank 85 through conduit 90 in amounts controlled by valve 91. The usual practice is to draw off an amount about equal to that added in order to purge the system.

As noted above, the liquor in tank 85 and flowing through conduit 90 will contain at least some HCN, in some cases its HCN content being quite appreciable. If so desired, this can be discarded but it is more practical to recover it in some way. This can be carried out in any desired method. One procedure is to pass the liquor in conduit 90 into tank 92, whereby the HCN content will be returned to the gas stream. This is not shown in the drawing since any desired alternative may be used.

We claim:

In combination with a reaction system for the catalytic combustion of a mixture of ammonia, a hydrocarbon and oxygen whereby a gaseous mixture comprising HCN and ammonia is produced, the improved separatory system which comprises: means for cooling said gaseous mixture without formation of water vapor, said means being directly connected with an ammonia absorption tower one end of which conveys ammonia-free gas mixture to a wash tower and the other end of which recycles washing fluid through an ammonium salt crystallizer; said wash tower being connected to a second cooler which in turn is connected to an HCN absorption tower provided with a conduit for conveying HCN-absorbed fluid to a steam stripper; means for condensing stripped HCN-bearing vapors; means for returning a portion of the HCN-bearing condensate to said steam stripper, and means for returning stripped fluid to said HCN absorption tower.

References Cited in the file of this patent

UNITED STATES PATENTS

| | | |
|---|---|---|
| 1,562,914 | Poindexter | Nov. 24, 1925 |
| 2,496,999 | Houpt et al. | Feb. 7, 1950 |
| 2,531,287 | Merrill et al. | Nov. 21, 1950 |
| 2,543,971 | Houpt et al. | Mar. 6, 1951 |